(12) United States Patent
Webb et al.

(10) Patent No.: US 6,688,773 B2
(45) Date of Patent: Feb. 10, 2004

(54) DEFORMABLE SPINDLE END PORTION

(75) Inventors: Alan Charles Webb, Northampton (GB); Peter Holland, Nottingham (GB); Peter Standring, West Bridgford (GB); Douglas H. Smith, Akron, OH (US); Larry L. Bahney, North Canton, OH (US)

(73) Assignee: The Timken Company, Canton, OH (US)

( * ) Notice: Subject to any disclaimer, the term of this patent is extended or adjusted under 35 U.S.C. 154(b) by 24 days.

(21) Appl. No.: 10/193,542

(22) Filed: Jul. 11, 2002

(65) Prior Publication Data

US 2002/0172439 A1 Nov. 21, 2002

Related U.S. Application Data

(62) Division of application No. 09/446,671, filed as application No. PCT/GB98/01823 on Jun. 22, 1998, now Pat. No. 6,443,622.

(30) Foreign Application Priority Data

Jun. 24, 1997 (GB) .............................................. 9713343

(51) Int. Cl.[7] .............................................. F16C 19/38
(52) U.S. Cl. ........................ 384/537; 384/448; 384/544
(58) Field of Search ................................ 384/537, 448, 384/544, 585, 589

(56) References Cited

U.S. PATENT DOCUMENTS

| | | |
|---|---|---|
| 3,451,243 A | 6/1969 | Gallinger |
| 3,583,511 A | 6/1971 | Asberg |
| 3,589,747 A | 6/1971 | Asberg |
| 3,620,060 A | 11/1971 | Ramseier |
| 4,668,111 A | 5/1987 | Kapaan |
| 4,893,960 A | 1/1990 | Beier et al. |
| 5,061,090 A | 10/1991 | Kriaski et al. |
| 5,226,738 A | 7/1993 | Valette et al. |
| 5,240,333 A | 8/1993 | Hassiotis et al. |
| 5,355,722 A | 10/1994 | Socier |
| 5,490,732 A | 2/1996 | Hofmann et al. |
| 5,544,962 A | 8/1996 | Hofmann et al. |
| 5,596,798 A | 1/1997 | Hofmann et al. |
| 5,603,554 A | 2/1997 | Monroe et al. |

FOREIGN PATENT DOCUMENTS

| | | |
|---|---|---|
| DE | 3418440 | 11/1985 |
| EP | 0 405 033 A1 | 1/1991 |
| EP | 0405033 | 1/1991 |
| GB | 2 233 404 | 1/1991 |
| WO | WO 98/25772 | 6/1998 |

Primary Examiner—Lenard A Footland
(74) Attorney, Agent, or Firm—Jones Day

(57) ABSTRACT

A hub (2) includes a spindle (14) which projects through a housing (4) and rotates relative to the housing (4) on a bearing (6) that is located between the spindle (14) and the housing (4). The bearing (6) has two sets of raceways (28,40) that are oblique to the axis x, and in addition rolling elements (36) arranged in two rows between the sets of raceways (28,40). The inner raceways (28) that fit around the spindle (14) and have back faces (32), with the back face (32) for one of the races (26) being against a shoulder (18) from which the spindle (14) projects. Initially, the end of the spindle (14) projects straight beyond the back face (32) of the outer race—indeed, so that the races (26) can be installed over the spindle (14). But once the housing (4) and races (26) are in a position around the spindle (14), the projecting end portion of the spindle (14) is deformed radially and axially in a rotary forming operation such that it transforms into a formed end (20) that lies behind back face (32) of the race (26). With the two races (26) between the formed end (20) and the shoulder (18). During the rotary forming operation the hub (26) rotates, and the end of its spindle (14) is forced against a rotating forming tool and the force is monitored. The housing (4) is restrained and the torque transferred from the rotating hub (2) to the housing (4) is monitored.

17 Claims, 4 Drawing Sheets

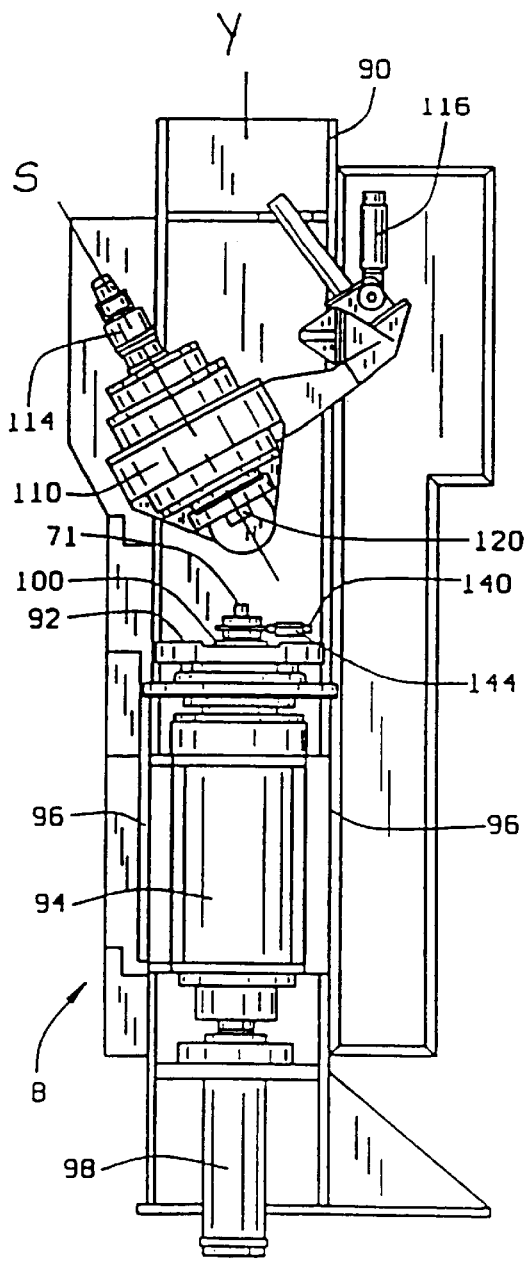
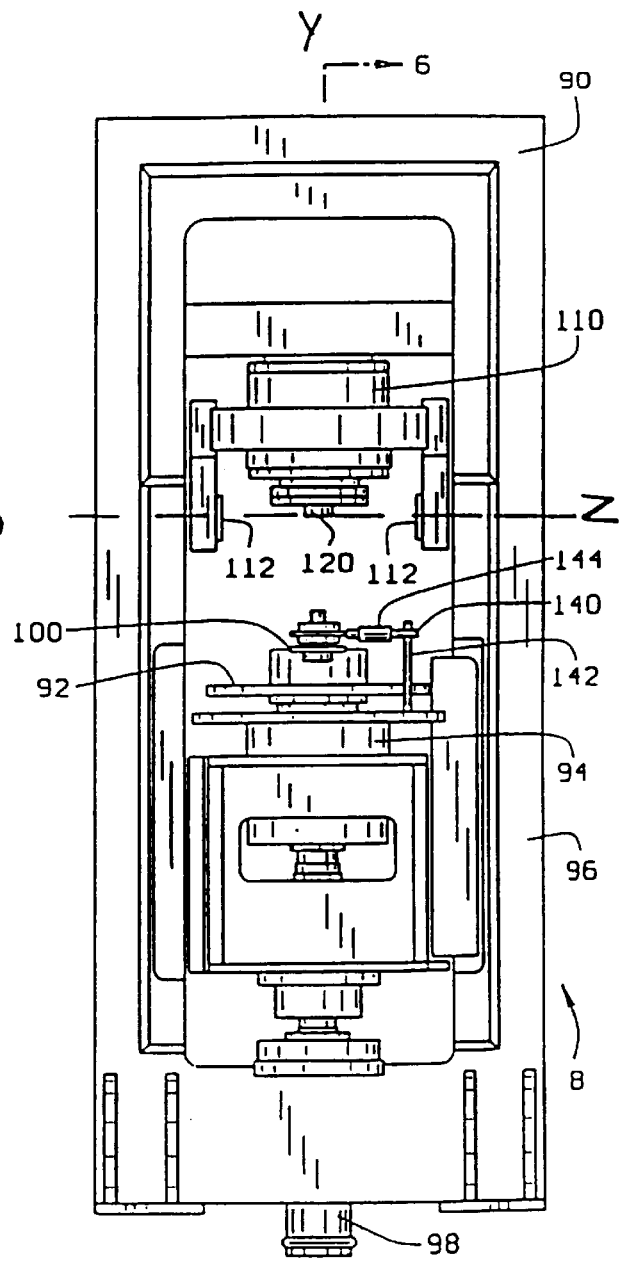
FIG. 6
FIG. 5

DEFORMABLE SPINDLE END PORTION

RELATED APPLICATIONS

This is a division of U.S. Ser. No. 09/446,671 filed Dec. 23, 1999, U.S. Pat. No. 6,443,622, which is a 371 of PCT/GB98/01823 filed Jun. 22, 1998.

BACKGROUND OF THE INVENTION

This invention relates in general to machine components having an antifriction bearing between them for enabling one component to rotate relative to the other and, more particularly, to a rotary forming process and machine for uniting the machine components and the bearing.

Several basic arrangements exist by which the road wheels of automotive vehicles are attached to the suspension systems of such vehicles, and all involve a rotatable hub of one type or another. In one arrangement, the hub has a drive flange, and a spindle which projects from the flange. The spindle rotates in a housing on an antifriction bearing. The housing is bolted to the suspension system of the vehicle, while the road wheel is bolted to the flange of the hub. Thus, the hub and road wheel rotate relative to the housing and suspension system with minimum friction. The bearing has angular raceways which are oriented such that they take thrust loads in both axial directions as well as radial loads. Typically, the bearing has inner races mounted on the spindle and rolling elements arranged in two rows between raceways on the inner races and more raceways in the housing. A nut threads over the end of the spindle to retain the inner races on the spindle, and this has the effect of holding the entire arrangement together, that is, unitizing the hub assembly.

But the threads require an extra machining operation in the manufacture of the hub and the installation of the nut represents another assembly operation. These operations are reflected in the ultimate cost of the hub assembly. Furthermore, a nut may work loose and disrupt the setting of the bearing, perhaps causing wheel wobble and damaging the seals that isolate the interior of the bearing and disrupt the setting of the bearing, perhaps causing wheel wobble and damaging the seals that isolate the interior the bearing.

Others have employed a rotary-formed bead at the end of a hub spindle to hold a hub assembly together. But forming the bead, at least against the back face of the inner race for an antifriction bearing, requires precision and close monitoring of the forming operation to ensure that the forming operation does not distort the bearing and detract from its operation.

SUMMARY OF THE INVENTION

The present invention resides in a process for uniting two machine components and a bearing that is between the components for enabling one component to rotate relative to the other component. The bearing may have raceways that lie oblique to the axis of rotation and two rows of rolling elements, with the arrangement being such that the rolling elements transmit both radial and axial loads between the components. At least one of the raceways is on a race that is fitted to one of the machine components. Initially, that machine component projects beyond the race without obstructing the race, but thereafter the end of the component is radially and axially deformed in a rotary forming operation to produce a formed end which lies behind the race and utilizes the assembly. During the rotary forming operation, the component that is deformed rotates, relative to the other component, against a forming-tool. Preferably, the other component is restrained. The torque transferred from the rotating component to the stationary component may be monitored. For example, one of the components includes a flange which is held stationary such that the flange serves as a torque arm.

The present invention further provides a machine for uniting first and second machine components and a bearing that is between the components to enable one component to rotate relative to the other component about an axis of rotation, the bearing including raceways and rolling elements arranged in at least one row between the raceways, such that the rolling elements transmit radial and axial loads between the machine components, the bearing including a separate race that is fitted to the second component with the second component initially extending beyond a back face on the race in provision of an end portion, said machine comprising: a table that rotates about an axis and is configured to receive and engage the second machine component with that axis of the bearing and the axis of the table coincident, whereby the second component rotates with the table: a restraining member configured to engage the first machine component and prevent it from rotating with the second component: a head located axially beyond the table, but presented toward the table and having a spindle that rotates; and a forming tool carried by the spindle of the head and configured to radially and axially deform the end portion of the second component when the table and head are brought toward each other, with deformation causing the metal of the end portion to flow behind the back face of the separate race for the bearing, whereby the machine unites the first and second component and the bearings.

In a separate aspect the present invention provides a bearing unitized between two machine components manufactured in accordance with the above described process, wherein an end portion of one of the machining components is radially and axially deformed about the outer surface of one end of the bearing, a portion of the outer surface of the deformed end describing a substantially flat clamping surface.

In a further aspect the present invention provides a machine component for use in the above described process, the machine component having an end portion with a substantially flat inner surface and an outer surface formed from a plurality of tapered surfaces each at different angles to the axis of rotation of the component. Preferably, the outer surface of the end portion is described by three connecting tapered surfaces with the middle tapered surface being at a smaller angle to the axis of rotation than the outer two tapered surfaces.

The invention also consists in the parts and in the arrangements and combination of parts hereinafter described and claimed.

BRIEF DESCRIPTION OF THE DRAWING

FIG. 5 is a front elevational view of the machine for deforming the end portion illustrated in FIG. 4 into the formed end illustrated in FIG. 5;

FIG. 6 is a sectional view of the machine taken along line 6—6 of FIG. 5; and

Corresponding reference numerals will be used throughout the several figures of the drawings.

DESCRIPTION OF A PREFERRED EMBODIMENT

The following detailed description illustrates the invention by way of example and not by way of limitation. This description will enable one skilled in the art to make and use the invention, and describes that which is presently believed to be the best mode of carrying out the invention.

Figure 1:
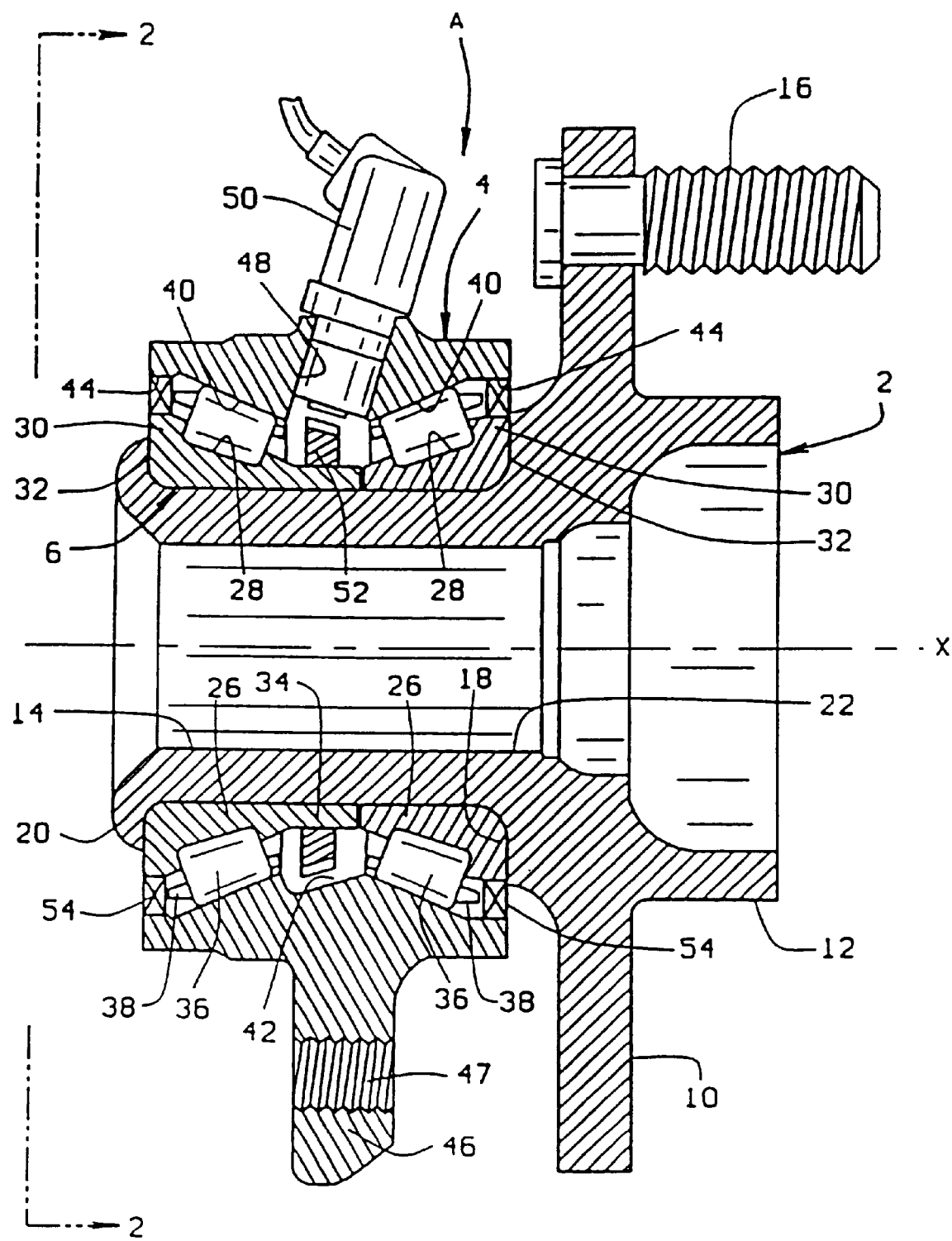
FIG. 1 is a sectional view of a hub assembly unitized with a formed end in accordance with the present invention.

Referring now to the drawings, a hub assembly A (FIG. 1) for attaching a road wheel for a vehicle to the suspension system of the vehicle includes a hub 2, a housing 4 and a bearing 6 which enables the hub 2 to rotate relative to the housing 4 about an axis X of rotation with relatively little friction. A road wheel and a brake disk are attached to the hub 2, while the housing 4 is secured firmly against a component of the suspension system for a vehicle.

The hub 2 (FIG. 1) has a flange 10, a short pilot diameter 12 on one side of the flange 10 and a spindle 14 on the other. Both the pilot diameter 12 and the spindle 14 lie along the axis X. The flange 10 contains lug bolts 16 which project axially from it in the direction of the pilot diameter 12, but lie radially outwardly from it. The pilot diameter 12 functions as a pilot for aligning the wheel with the hub 2 as the wheel is advanced against the flange 10, to which it is secured with lug nuts that thread over the bolts 16. The spindle 14 merges from a shoulder 18 set inwardly from the inside face of the flange 10 and terminates in a formed end 20 located at its opposite end. The spindle 14 contains a bore 22 which opens out of it at the formed end 20.

The bearing 6 includes (FIG. 1) an inner race in the form of two cones 26 which fit around the spindle 14 where they are captured between the shoulder 18 and the formed end 20, there being an interference fit between each cone 26 and the spindle 14. Each cone 26 has a tapered raceway 28 that is presented outwardly away from the axis X, a thrust rib 30 at the large end of its raceway 28, and back face 32 that is squared off with respect to the axis X on the end of the thrust rib 30. The inboard cone 26 is somewhat longer than the outboard cone 26 by reason of a cylindrical cone extension 34 which projects beyond the small end of its raceway 28. The inboard cone 26 at its cone extension 34 abuts the small end of the outboard cone 26 along the spindle 14, that is to say, the two cones 26 abut their front faces. The back face 32 of the outboard cone 26 abuts the shoulder 18 that lies immediately inwardly from the flange 10. The formed end 20 outwardly beyond the inboard cone 26 and lies against the back face 32 of that cone. Thus, the two cones 26 are captured on the spindle 14 between the shoulder 18 and the formed end 20. The two cones 26 abut their opposite ends, that is at their front faces, so that the extension 34 lies between the raceways 28 out of the two cones 26.

In addition to the cones 26, the bearing 6 includes tapered rollers 36 arranged in two rows, there being a separate row around each cone 26. Actually, the rollers 36 extend around the raceways 28 for the cones 26 with their tapered side faces along the raceways 28 and their large end face against the thrust ribs 30. The rollers 36 of each row are essentially on apex, which means that the envelopes in which their tapered side faces lie will have their apices located at a common point along the axis X. Each row of rollers 36 has a cage 38 to maintain the proper spacing between the rollers 36 in that row.

The ring-like housing 4 surrounds the spindle 14 as well as the two cones 26 and the two rows of rollers 36. It forms part of the bearing 6 in that it has tapered raceways 40 which are presented inwardly toward the axis X. Indeed, the housing 4 constitutes the outer race of the bearing 6. The raceways 40 on the housing 4 taper downwardly toward an intervening surface 42 which separates them. The rollers 36 likewise lie along the raceways 40 of the housing 4, contacting the raceways 40 at their tapered side faces. At their large ends, the raceways 40 open into short end bores 44 in which the thrust ribs 30, of the two cones 26 are located.

Figure 2:
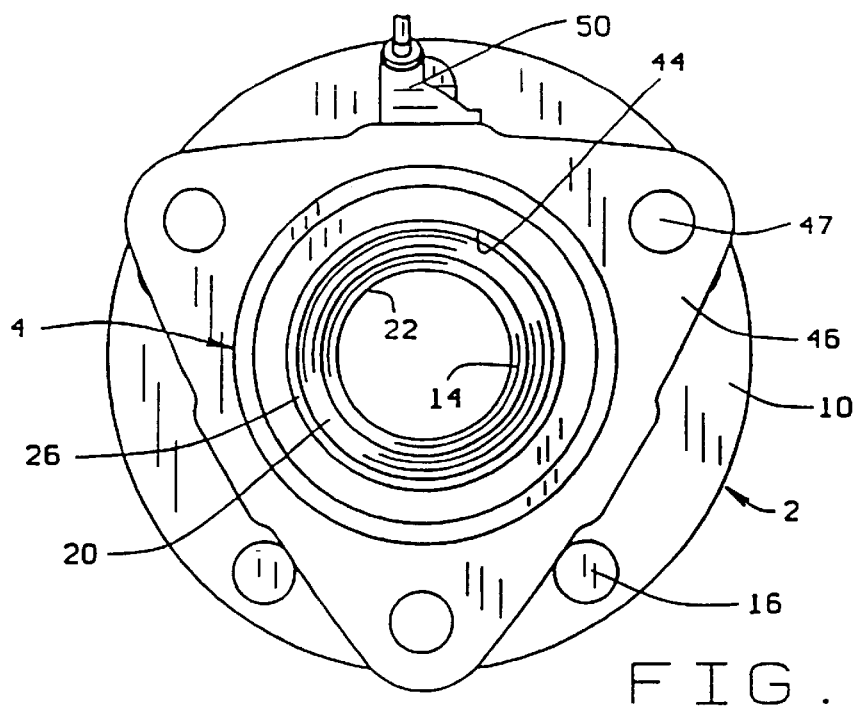
FIG. 2 is an end view of the hub assembly taken along line 2—2 of FIG. 1.

Generally midway between its ends, the housing 4 has a triangular flange 46 (FIG. 2) which fits against a component of a suspension system for a vehicle. Here the housing A is secured firmly to the suspension system component with bolts that engage threaded holes 47 located in the lobes of the triangular flange 46. Along one of the edges of the triangular flange 46 the housing 4 contains a bore 48 (FIG. 1) which extends inwardly, obliquely to the axis X, and opens into the interior of the housing 4 through the intervening surface 42.

The oblique bore 48 contains a speed sensor 50, the inner end of which is presented toward an excitor ring 52 that fits over the extension 34 at the small end of inboard cone 26. Thus, the excitor ring 52 lies between the two rows of rollers 36. The ring 52 has teeth or other disruptions which cause the sensor 50 to produce a pulsating signal as those disruptions move past the end of the sensor 50, and this of course occurs as the spindle 14 and the cones 26 around it rotate. The frequency of the signal reflects the angular velocity of the spindle 14 and indeed the entire hub 2.

The end bores 44 in the housing 4 contain seals 54 which fit around the thrust ribs 30 on the cones 26 to establish dynamic fluid barriers at the ends of the housing 4. These barriers isolate the rollers 36 and the raceways 28 and 40 from road contaminants, such as water, ice-melting salts and dirt.

The formed end 20 lies behind the back face 32 of the inboard cone so that the two cones 26 are captured between shoulder 18 and the formed end 20 with their small ends in abutment. This not only retains the cone 26 in the spindle 14, but also retains the housing 4 and rollers 36 in place, this being attributable to the tapered geometry. In short, the formed end 20 unitizes the hub 5 assembly A.

Figure 3:
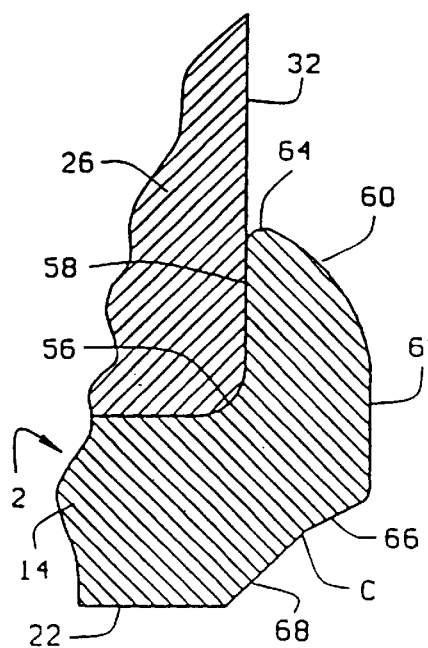
FIG. 3 is an enlarged partial sectional view of the formed end that unitizes the hub assembly.

More specifically, the formed end 20 wraps around the inboard cone 26 at a profiled or curved inside corner 56 (FIG. 3) and immediately outwardly from the corner 56 has a flat inside end face 58 that lies along the back face 32 of the inboard cone 26. On its opposite side, the formed end 20 has a curved outside end surface 60 which merges with a flat outside end surface 62 that lies perpendicular to the axis X. The curved outside end surface 60 and the flat inside end face 58 are connected through a relatively sharp, yet curved, outside corner 64. The flat outside end surface 62 merges into a first beveled surface 66 which lies at an oblique angle with respect to the axis X and the beveled surface 66 merges into another second beveled surface 68 located at a somewhat steeper angle to the axis X. The steeper beveled surface 68 leads into the bore 22. The outside corner 64 lies radially at or slightly inwardly from the large end of the raceway 28 on the inboard cone 26. The flat outside end surface 62 provides a clamping surface for the hub assembly when clamped against a constant velocity joint or other such member.

Figure 4:
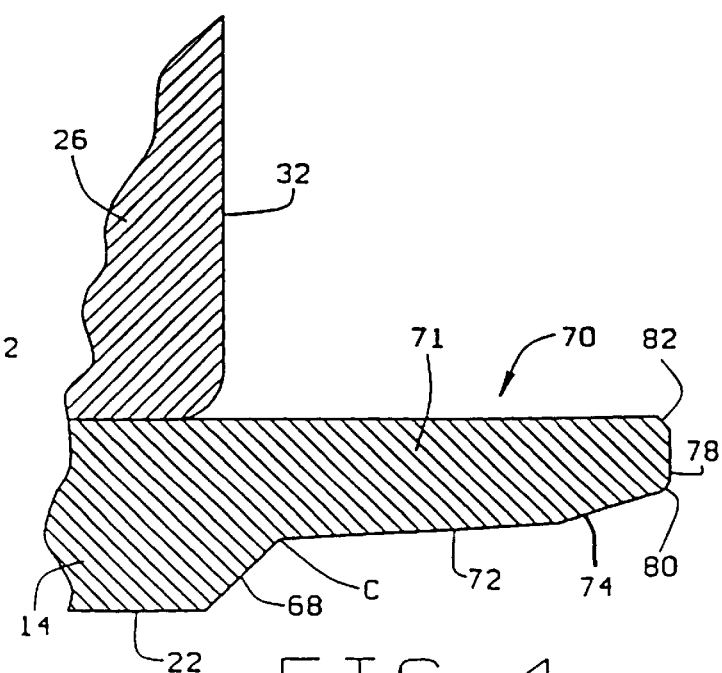
FIG. 4 is a partial sectional view of an end portion prior to deformation into the formed end of FIG. 3.
Figure 7C:
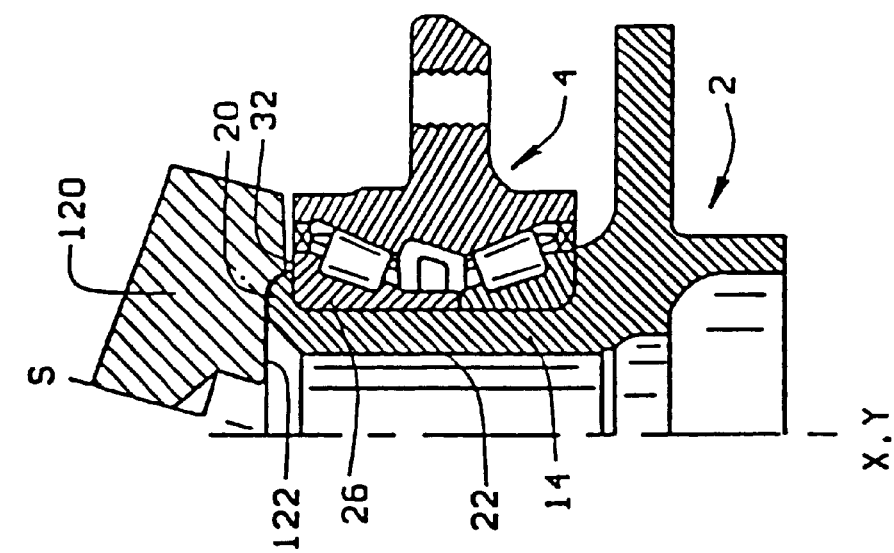
FIGS. 7A B, and C are sectional views in elevation showing the tool for deforming the end portion and sequentially illustrating the deformations.
Figure 7B:
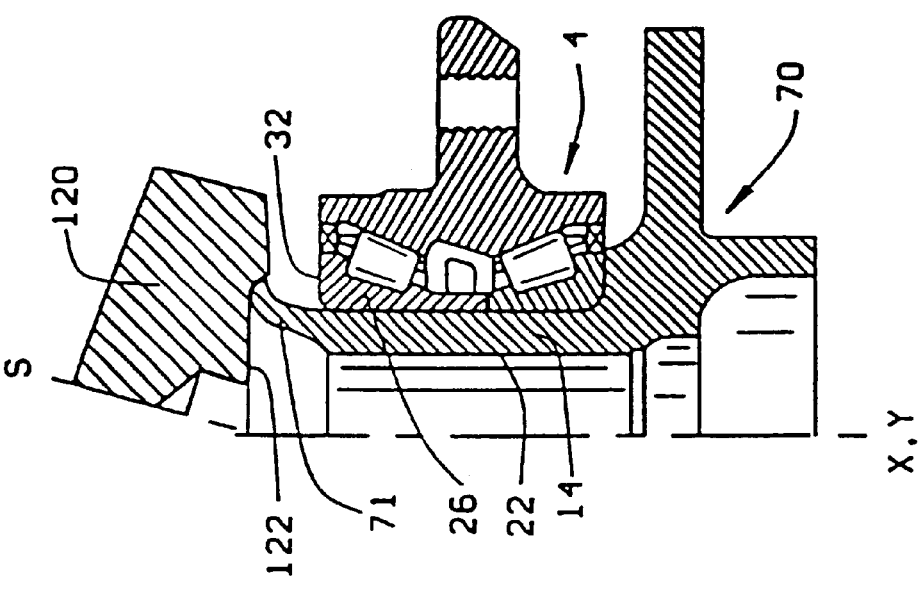
Figure 7A:
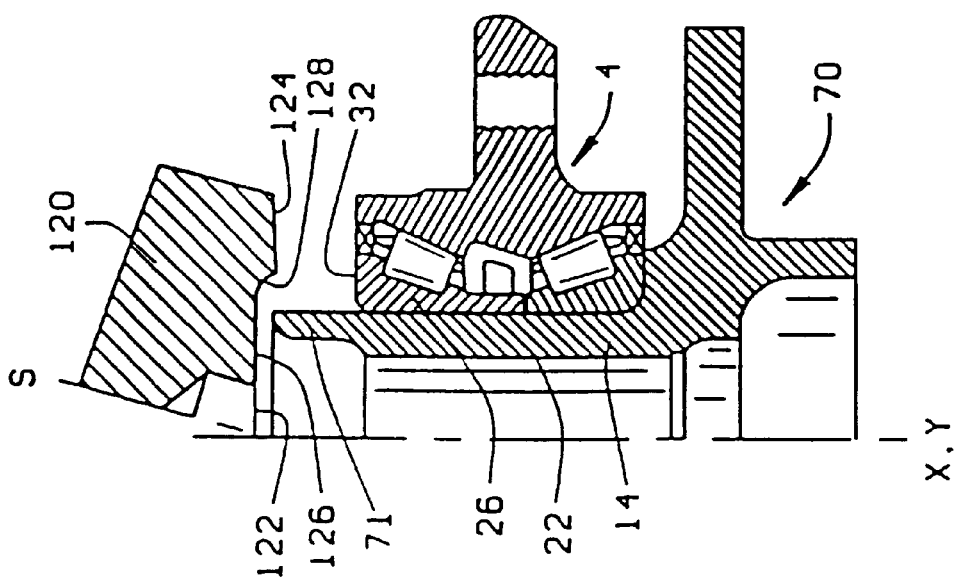

The hub 2 does not always have the formed end 20. Initially, it exists as a pre-form 70 (FIG. 4), which is the condition in which it forged and then machined. In the pre-form 70 the spindle 14 is straight, that is to say, its cylindrical exterior surface continues axially to the very end of the spindle 14. The two cones 26, the rollers 36 of the two rows, and housing 4, which is captured by the rollers 36, are all installed over the straight spindle 14 of the pre-form 70, leaving an end portion 71 of the spindle 14 projecting beyond the inboard cone 26. Thereupon, the projecting end portion 71 is deformed radially outwardly and axially into the formed end 20 in a rotary forming operation (FIG. 7).

In the pre-form 70, the spindle 14 has (FIG. 4) the first beveled surface 68 that leads away from the bore 22. The beveled surface 68 merges into a slightly tapered surface 72 at a corner or circle C of transition. The slightly tapered surface 72 merges into another tapered surface 74 leads of greater angle. The steeper tapered surface 74 leads out to a flat end surface 78 with which it merges at a curved surface 80. The flat end surface 78 at its periphery has a chamfer 82.

That end portion 71 of the pre-form 70 initially projects beyond the back face 32 of the inboard cone 26 without change in its external diameter, but is thereafter transformed into the formed end 20 in a rotary forming procedure. (FIG. 7). In this procedure the metal of the end portion 71 flows radially and axially, all without acquiring cracks, and ultimately assumes the configuration of the formed end 20. The transformation occurs in a rotary forming machine B. The rotary forming machine B includes (FIGS. 5 and 6) a frame 90 which carries a table 92 that rotates about a vertical axis Y.

Actually, the table 92 rotates on a base 94 with the power for producing the rotation being supplied by a motor, either electric or hydraulic, that is in the base 94. The base 94 follows vertical ways 96 on the frame 90, with this translational movement deriving from a ram 98 that is located between the bottom of the frame 90 and the base 94. The ram 98 contains a load cell for measuring the force exerted by it. The table 92 has an upwardly presented surface out of which a socket 100 opens, and the socket 100 is configured to receive the pilot diameter 12 and the flange 10 of the pre-form 70, with the axis X of the pre-form 70 coinciding with the axis Y of rotation for the table 92, and with the spindle 14 projecting upwardly. The socket 100 also receives the lug bolts 16 as well, and they engage the pre-form 70 with the table 92 such that the pre-form 70, when on the table 92, will rotate with the table 92 without slipping.

The machine B also includes a cross head 110 which is mounted on the frame 90 by means of trunnions 112, the common axis Z of which intersects the axis Y for the table 92 at a right angle. The cross head 110 has a spindle 114 which rotates about an axis S that intersects the trunnion axis Z and the table axis Y, with its inclination as to the axis Y being variable and dependent on the position of the cross head 110. That position is controlled by an electric screw jack 116 which is connected between the cross head 110 and the frame 90. The cross head 100 carries a motor, either electric or hydraulic, which rotates the spindle 114.

At its lower end, the spindle 114 has a forming tool 120 attached to it, and the tool 120 has a contoured face 122 (FIG. 7) that is presented toward the table 92 so that it will bear against the end portion 71 of the spindle 14 on the pre-form 70 as the table 92 is elevated. The contour leaves the tool 120 with a peripheral rib 124 and a depressed center region having a flat surface 126 that merges with the rib 124 along an arcuate surface 128 which matches the curvature of the curved end surface 60 on the formed end 20.

Finally, the machine B has a restraining arm 140 which at one end is attached to a post 142 that rises from the base 94 to an elevation above the table 92. At its other end the arm 140 is configured to fit against one of the flanges 46 of the housing 4 for the particular hub assembly A that is in the socket 100 of the table 92. The arm 140 prevents the housing 4 from rotating with the hub 2 when the table 92 revolves. Under the circumstances the flange 46 of housing 4 serves as a torque arm. The restraining arm 140 extends over the table 92 generally perpendicular to the torque arm formed by flange 46 and contains a sensor 144 for measuring the force exerted on the arm 140 by flange 46 of the housing 4. Hence, the sensor 144 enables one to measure the torque exerted on the housing 4 by the rotating hub 2.

In order to complete the hub assembly A from its component parts, some of the parts first require preassembly. For example the bolts 16 are fitted to the flange 10 on the hub 2—or more accurately to the flange 10 on the pre-form 70 that eventually becomes the hub 2. Also, the seal 54 is pressed over the rib 30 of the outboard cone 26. Thereupon, the outboard cone 26 is pressed over the straight spindle 14 on the pre-form 70 to its fullest extent, that is until its back face 32 abuts the shoulder 18 at the end of the spindle 14. After a lubricant is applied to the outboard cone 26 and the rollers 36 which surround it, the housing 4 is lowered over outboard cone 26 and its row of rollers 34 and aligned with seal 26 on the outboard cone 26. Further advancement forces the seal 26 into the outboard end bore 44 and seats the rollers 36 against the outboard raceway 40 of the housing 4. Next the inboard cone 26 is pressed over the spindle 14 of the pre-form 70 until the extension 34 at its small end comes against the end of the outboard cone 26. This positions the exitor ring 52 within the intervening surface 42 of the housing 4 and seats the rollers 34 that surround the inboard cone 26 against the inboard raceway 40 of the housing 4. Moreover, for all intents and purposes, it brings the bearing 6 which is so formed to the proper setting. At this time the inboard seal 54 may be pressed into the inboard end bore 44 of the housing 4 and over the thrust 30 of the inboard cone 26. At this juncture in the assembly procedure, the end portion 71 on the spindle 14 of the pre-form 70 projects well beyond the back face 32 of the inboard cone 26.

Once the housing 4 and bearing 6 have been fitted to the pre-form 70, the partially completed assembly is transferred to the machine B to permanently unite the hub 2, housing 4 and bearing 6. In this regard, the pre-form 70 that becomes the hub 2 is fitted to the socket 100 in the table 92 of the machine B with the pilot diameter 12 on the pre-form 70 presented downwardly and serving to position the pre-form 70 with its axis X coinciding with the axis Y of rotation for the table 92. The bolts 16 in the flange 10 of the pre-form 70 project downwardly, engaging the table 92, so that when the table 92 revolves, the pre-form 70 rotates without slipping.

The table 92 does indeed revolve, it being turned by the motor in the base 94. The forming tool 120 likewise turns in the same direction, although at a lesser velocity, and it is powered by the motor in the crosshead 110. Next the ram 98 is energized, and it elevates the rotating table 92 and the partially assembled hub assembly A that is on it. The extended end portion 71 of the spindle 14 comes against the rotating forming tool 120 of the crosshead 110, and the tool 120 deforms that end portion 71 to displace the metal that is in it radially outwardly and axially toward the cone 26. This deformation creates the formed end or 20. The end portion 71 is thus subjected to both radial and axial deformation which in turn produces desirable work hardening of the end portion 71 as enabling the formation of both curved and flat outer surfaces on the formed end with a reduced risk fracture.

More specifically, the end portion 71 of the spindle 14 aligns with the flat surface 126 on the contoured face 122 of the tool 120, and as the spindle 14 advances along the axis Y, the flat end surface 78 on the end portion 71 comes against flat surface 126 of the tool 120. Continued advancement of the spindle 14 causes the end portion 71 also to turn radially outwardly toward the arcuate surface 128 on the face 122 of the tool 120. As a consequence, the tapered surface 74 and thereafter the tapered surface 72 on the end portion 71 come against the flat surface 126 of the tool 120. Eventually, with continued advancement of the end portion 71 into the tool 120, the end portion 71 deforms outwardly to assume the configuration of arcuate surface 128, while the adjoining region becomes flat, owing to its presence against the flat surface 126 on the tool 120. This accounts for the curved end surface 60 and the adjacent flat surface 62 on the formed end 20 that is imparted to the spindle 14.

The ram 98 does not advance the spindle 14 into the tool 120 at a constant velocity. Initially, the velocity is greater than near the end. Thus, the ram 98 advances more slowly as it works the metal of the end portion 71 against and along the back face 32 of the inboard cone 26. Moreover, as the ram 98 advances, the force exerted by it is registered by the load cell in the ram 98 and is monitored. The ram 98 dwells after the final increment of advance to insure that the formed end 20 formed by the tool 120 retains the desired configuration. For a hub 2 with its spindle 14 having a 45 mm outside diameter, the force exerted by the ram 98 preferably should be between 6 and 8 tonnes and should not exceed 10 to 12 tonnes.

The forming tool 120, as the spindle 14 on the pre-form 70 advances into it, causes the metal of the pre-form 70 to displace gradually or, in other words, flow. To this end, the metal of the pre-form 70 must have sufficient ductility to undergo the flow without developing cracks or fissures. 1040 steel which has a sulfur content less than 0.05% by weight and preferably less than 0.02% has this capacity. The deformation work hardens the steel, so the hardness of the formed end 20 is somewhat greater than the hardness of the remainder of the hub 2.

The configuration of the extended portion 71 of the pre-form 70, the distance it projects beyond the back face 32 of the inboard cone 26, and advance imparted to the table 92 by the ram 98 are all such that the formed end 20 does not deform the inboard cone 26 or impart excessive preload to the bearing 6. For example, if the end portion 71 of the pre-form 70 extends too far beyond the back face 32 of the inboard cone 26 or otherwise contains excessive material in that region, the space between the forming tool and the cone back face 32 cannot accommodate all of the material, and the inboard cone 26 undergoes distortion in the region of its thrust rib 30 and raceway 28. Likewise, if the dwell height of the ram 98 is too high, again inadequate space exists to contain the metal which flows along the cone back face 32 and the cone 26 will experience distortion.

Visual inspections of the formed end 20 will not reveal if it has distorted the inboard cone 26. But the torque in the bearing 6 will, and the sensor 144 in the restraining arm 140 in effect measures that torque. Moreover, the sensor 144 reveals the torque without having to remove the hub assembly A to another fixture for a separate test, and thus immediately identifies a hub assembly A which should be rejected. For a bearing 6 that fits around a hub spindle 14 with a 45 mm diameter, the maximum torque in the bearing should not exceed 35 to 40 in-lbs. The change in torque during the rotary forming should not exceed 8 to 10 in-lbs.

The force registered by the load cell in the ram 98 also serves to identify bearing assemblies that require rejection. In this regard, excessive force exerted by the ram indicates an error in the geometry of the pre-form 71 or perhaps, an error in setting up the machine B. In any event, excessive force exerted by the ram 98 may distort the inboard cone 26, causing permanent damage to the bearing assembly A. For a hub 2 having a spindle 14 with a 45 mm outside diameter, a ram force exceeding 10 to 12 tonnes signals a possible defect.

The restraining arm 140 not only facilitates measurement of the torque, but it also holds the housing 2 fixed while the hub 2 and rollers 36 rotate within it. This seats the rollers along the raceways 28 and against the thrust ribs 30 of the two cones 26 and also seats them along the raceways 40 of the housing 4. It further prevents brinnelling of the raceways 28 and 40.

In lieu of the outboard cone 26 being a separate component, it may be integrated into the hub 2. In other words, the outboard inner raceway 28 may be formed directly on the spindle 14, just as the outer raceways 40 are formed directly on the housing 4 On the other hand, the outer raceways 40 may be formed on separate races or cups fitted into the housing 4. The rolling elements need not be tapered rollers 36, but may be balls or other rolling elements well known in the art, and of course the raceways in that instance would conform to them, yet preferably remain oblique to the axis.

In view of the above, it will be seen that the several advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A spindle having an outer cylindrical spindle surface and an axial end bore with an inner cylindrical spindle surface, the spindle having a radial spindle thickness between said inner and outer cylindrical spindle surfaces, the spindle having a deformable annular end portion with internal and outer surfaces and a terminal end surface, the outer surface of the deformable annular end portion being a continuation of the outer cylindrical spindle surface, the deformable end portion having a radial thickness between its internal and outer surfaces that is less than the radial spindle thickness, the internal surface of the deformable end portion being spaced radially outwardly of the inner cylindrical spindle surface and merging into the inner cylindrical spindle surface along a straight beveled surface, the deformable end portion having a tapered inner surface that tapers inwardly along at least a portion of the length thereof from said terminal end surface toward said beveled surface so that said deformable end portion gradually increases in thickness along at least a portion of the length thereof from said terminal end surface toward said beveled surface.

2. The spindle of claim 1 wherein said tapered inner surface extends the entire length of said internal surface of said deformable end portion.

3. The spindle of claim 2 wherein said tapered internal surface includes at least two different tapers, one of the tapers being adjacent the terminal end surface and sloping outwardly at an angle to the spindle axis at a greater angle than the other of the tapers.

4. A spindle having inner and outer spindle surfaces and a rotational axis, the spindle having a deformable annular end portion with internal and external surfaces and a terminal end surface, the external surface of the deformable annular end portion being a continuation of the spindle outer surface and the internal surface of the deformable annular end portion being spaced radially outwardly from the spindle inner surface, characterized in that the internal surface of the deformable annular end portion has a tapered surface that extends along at least a portion of its length from the terminal end surface of the deformable annular end portion and is inclined inwardly toward the rotational axis from the terminal end surface so that the deformable annular end portion gradually increases in radial thickness along at least a portion of its length axially inwardly from the terminal end surface, and wherein a straight beveled surface extends outwardly from the spindle inner surface at an oblique angle to the spindle rotational axis and merges with the internal surface of the deformable annular end portion at a location such that when the deformable annular end portion is outwardly deformed to have its external surface extend outwardly in a direction away from the rotational axis and intersect with the spindle outer surface at an inside corner, the location of the merger between the straight beveled surface and the internal surface of the deformable annular end portion is generally diagonally opposite from the inside corner.

5. The spindle of claim 4 wherein the tapered surface is a first tapered surface and the internal surface of the deformable annular end portion includes a second tapered surface extending along at least a portion of the length thereof from the first tapered surface toward the rotational axis.

6. The spindle of claim 5 wherein the second tapered surface extends along a greater portion of the length of the deformable annular end portion than the first tapered surface.

7. The spindle of claim 6 wherein the second tapered surface is inclined to the spindle rotational axis at a smaller angle than the angle of inclination of the first tapered surface to the spindle axis.

8. The spindle of claim 7 wherein the straight beveled surface is inclined to the spindle rotational axis at a larger angle than the first tapered surface, and the second tapered surface is inclined to the spindle axis an angle that is smaller than the inclination angles of both the straight beveled surface and the first tapered surface.

9. The spindle of claim 5 wherein the intersection between the terminal end surface and the tapered surface is rounded.

10. A spindle having a rotational axis and a deformable annular end portion with a terminal end surface and an inner surface, said inner surface of said deformable annular end portion including a tapered surface extending along at least a portion of the length of said inner surface of said deformable end portion from the terminal end surface toward the rotational axis, said tapered surface being inclined inwardly toward the rotational axis in a direction from the terminal end back inwardly into the annular end portion, and the intersection between the terminal end surface and the first tapered surface being rounded.

11. The spindle of claim 10 wherein the tapered surface is a first tapered surface and the inner surface of the deformable annular end portion includes a second tapered surface that is outwardly deformable along with the deformable annular end portion and extends along at least a portion of the length of the inner surface from the first tapered surface toward the rotational axis and axially of the spindle back inwardly into the annular end portion.

12. The spindle of claim 11 wherein the second tapered surface extends along a greater portion of the axial length of the deformable annular end portion than the first tapered surface.

13. The spindle of claim 12 wherein the second tapered surface is inclined to the spindle rotational axis at a smaller angle than the angle of inclination of the first tapered surface to the spindle axis.

14. A spindle having a rotational axis and a deformable annular end portion with a terminal end surface and an inner surface, said inner surface of said deformable annular end portion including a tapered surface extending along at least a portion of the length of said inner surface of said deformable end portion from the terminal end surface toward the rotational axis, said tapered surface being inclined inwardly toward the rotational axis in a direction from the terminal end back inwardly into the annular end portion, and said deformable annular end portion having a cylindrical outer surface and a radial thickness that decreases along its length in a direction toward the terminal end surface thereof.

15. A spindle having a rotational axis and a deformable annular end portion with a terminal end surface and an inner surface, said inner surface of said deformable annular end portion including a tapered surface extending along at least a portion of the length of said inner surface of said deformable end portion from the terminal end surface toward the rotational axis, said tapered surface being inclined inwardly toward the rotational axis in a direction from the terminal end back inwardly into the annular end portion, said tapered surface being a first tapered surface and the inner surface of the deformable annular end portion including a second tapered surface extending along at least a portion of the length thereof from the first tapered surface toward the rotational axis, said spindle including an inner beveled surface inclined to the rotational axis and intersecting said second tapered surface at the axial inner end of said deformable annular end portion, said inner beveled surface being inclined to the spindle rotational axis at a larger angle than the first tapered surface, and the second tapered surface being inclined to the spindle axis at an angle that is smaller than the inclination angles of both the beveled surface and the first tapered surface.

16. A spindle having a rotational axis and a deformable annular end portion with a terminal end surface and an inner surface, said inner surface of said deformable annular end portion including a tapered surface extending along at least a portion of the length of said inner surface of said deformable end portion from the terminal end surface toward the rotational axis, said tapered surface being inclined inwardly toward the rotational axis in a direction from the terminal end back inwardly into the annular end portion, and said terminal end surface of said deformable annular end portion being flat.

17. The spindle of claim 11 wherein said spindle includes an inner beveled surface that is inclined to the rotational axis and intersects said second tapered surface at the axial inner end of said deformable annular end portion.

* * * * *